United States Patent
Park (10) Patent No.: US 11,066,056 B2
(45) Date of Patent: Jul. 20, 2021

(54) CONTROL SYSTEM OF REGENERATIVE BRAKING OF HYBRID VEHICLE AND CONTROL METHOD FOR THE SAME

(71) Applicants: Hyundai Motor Company, Seoul (KR); Kia Motors Corporation, Seoul (KR)

(72) Inventor: Jeonghwan Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 290 days.

(21) Appl. No.: 16/202,625

(22) Filed: Nov. 28, 2018

(65) Prior Publication Data
US 2019/0176787 A1    Jun. 13, 2019

(30) Foreign Application Priority Data
Dec. 11, 2017   (KR) .................. 10-2017-0169586

(51) Int. Cl.
*B60T 8/40* (2006.01)
*B60T 8/32* (2006.01)

(52) U.S. Cl.
CPC ........... *B60T 8/4086* (2013.01); *B60T 8/409* (2013.01); *B60T 8/3255* (2013.01); *B60T 2220/04* (2013.01); *B60T 2270/60* (2013.01)

(58) Field of Classification Search
CPC ...... B60T 8/4086; B60T 8/409; B60T 8/3255; B60T 2220/04; B60T 2270/60
USPC ......................................................... 701/70
See application file for complete search history.

(56) References Cited

U.S. PATENT DOCUMENTS

| | | | | |
|---|---|---|---|---|
| 6,488,109 B1* | 12/2002 | Igaki | ................. | B60T 8/17557 180/169 |
| 9,002,609 B2* | 4/2015 | Nakamura | ............ | B60W 10/08 701/71 |
| 2008/0236959 A1* | 10/2008 | Hashida | ................. | B60T 8/4077 188/72.2 |
| 2012/0062023 A1* | 3/2012 | Ohkubo | ................. | B60T 8/4081 303/3 |

(Continued)

FOREIGN PATENT DOCUMENTS

| | | | | |
|---|---|---|---|---|
| GB | 2413117 A | * 10/2005 | ............ | B60L 3/0038 |
| JP | 08295211 A | * 11/1996 | | |

(Continued)

OTHER PUBLICATIONS

Chuan-xue et al., "Based on Fuzzy-PID Control of the Pedal Stroke Simulator Applications in Brake-By-Wire-Systems," 2012, Publisher: IET.*

(Continued)

*Primary Examiner* — Tuan C To
(74) *Attorney, Agent, or Firm* — Mintz Levin Cohn Ferris Glovsky and Popeo, P.C.; Peter F. Corless (57) ABSTRACT

A control system of regenerative braking of hybrid vehicle is provided. The system includes a pedal simulator that provides a brake feeling to a driver by generating pedal effort according to a pedal stroke input through a brake pedal. A data detector detects data for pedal simulator control and a controller stores a predetermined value of the pedal effort and operates the pedal simulator according to the predetermined pedal effort value based on the detected data.

13 Claims, 3 Drawing Sheets

(56) References Cited

U.S. PATENT DOCUMENTS

| | | | | |
|---|---|---|---|---|
| 2013/0062932 | A1* | 3/2013 | Yagashira | B60W 10/08 303/3 |
| 2015/0001919 | A1* | 1/2015 | Murayama | B60T 8/34 303/14 |
| 2015/0120161 | A1* | 4/2015 | Kamiya | B60T 7/042 701/70 |
| 2015/0203086 | A1* | 7/2015 | Miyazaki | B60T 7/04 60/545 |
| 2016/0200200 | A1* | 7/2016 | Nakata | B60W 30/18127 303/3 |
| 2017/0072929 | A1* | 3/2017 | Kim | B60T 8/409 |
| 2017/0106843 | A1* | 4/2017 | Jeong | B60T 11/232 |
| 2017/0158180 | A1* | 6/2017 | Kim | B60T 7/042 |
| 2018/0056956 | A1* | 3/2018 | Kim | B60T 7/042 |
| 2018/0099652 | A1* | 4/2018 | Jung | B60T 8/4081 |
| 2018/0111594 | A1* | 4/2018 | Kim | B60T 8/17 |
| 2018/0118179 | A1* | 5/2018 | Ko | B60T 13/142 |
| 2019/0118832 | A1* | 4/2019 | Mimura | B60W 50/14 |

FOREIGN PATENT DOCUMENTS

| | | | |
|---|---|---|---|
| JP | 09295523 A | * | 11/1997 |
| KR | 20150021629 A | * | 3/2015 |
| KR | 20160069541 A | * | 6/2016 |
| KR | 20170031402 A | * | 3/2017 |

OTHER PUBLICATIONS

Jiweon et al., "Development of Brake System and Regenerative Braking Cooperative Control Algorithm for Automatic-Transmission-Based Hybrid Electric Vehicles," 2015, vol. 64, Publisher: IEEE.*

Gou et al., "The Coordinated Control of Motor Regenerative Braking Torques Defined by Accelerator Pedal and Brake Pedal of Electric Vehicle," 2012, Publisher: IEEE.*

* cited by examiner

CONTROL SYSTEM OF REGENERATIVE BRAKING OF HYBRID VEHICLE AND CONTROL METHOD FOR THE SAME

CROSS-REFERENCE TO RELATED APPLICATION

This application claims priority to and the benefit of Korean Patent Application No. 10-2017-0169586 filed on Dec. 11, 2017, the entire contents of which are incorporated herein by reference.

BACKGROUND

(a) Field of the Invention

The present invention is related to a control system of regenerative braking of hybrid vehicle and a control method for the same, and more particularly, to a control system of regenerative braking of hybrid vehicle and a control method for the same that learn and compensate a brake feeling based on a driver's braking tendency.

(b) Description of the Related Art

A hybrid electric vehicle is a vehicle type that uses two or more power sources, generally operated by an engine and a motor. The hybrid electric vehicle may form various structures using two or more power sources including an engine and a motor. The motor provided to the hybrid vehicle supplements engine power during acceleration or hill climbing. The motor provided to the hybrid vehicle is operated as a generator during braking of the vehicle to generate braking force by converting kinetic energy generated at the time of the braking to electrical energy. Electrical energy thus converted is charged to a battery.

A system for converting the kinetic energy generated during the braking to electrical energy and recovering the electrical energy thus recovered is referred to as a regenerative braking system. The past hybrid vehicles were developed to have fixedly constant brake feeling by regenerative braking system. Recently, technologies like flex mode in which several engagements of brake feeling are provided. In the case of the flex mode, the driver may select the settings regarding the brake feeling based on the driver's braking tendency. However, since the settings are fixed and discontinuous, it is difficult to satisfy all the drivers with different driving tendencies A brake feeling is a common item for the drivers to evaluate the braking performance of vehicles. However, since the brake feeling by regenerative braking is usually different from the brake feeling by hydraulic braking, there is a difficulty to satisfy all the drivers by fixedly setting the brake feeling in a few steps. Meanwhile, since the factors regarding adjusting the brake feeling are different to change if they are fixed in mass production processes, there is a problem that it is impossible to change them easily even if there is customer's request.

The above information disclosed in this section is merely for enhancement of understanding of the background of the invention and therefore it may contain information that does not form the prior art that is already known in this country to a person of ordinary skill in the art.

SUMMARY

The present invention provides a control system of regenerative braking of hybrid vehicle and a control method for the same which is capable of variably adjusting the brake feeling by regenerative braking through repeating learning and compensation according to the driver's braking tendency, A control system of regenerative braking of hybrid vehicle according to an exemplary embodiment of the present invention may include: a pedal simulator configured to provide brake feeling to driver by generating pedal effort based on a pedal stroke input through a brake pedal; a data detector configured to detect data for pedal simulator control; and a controller configured to store a predetermined value of the pedal effort and operate the pedal simulator based on the predetermined pedal effort value based on the detected data; wherein the controller is configured to compensate and learn the predetermined pedal effort value based on a running condition and a braking condition.

The controller may further be configured to perform an increasing compensation for the pedal effort value when the braking condition is determined to be a sudden braking condition, perform a decreasing compensation for the pedal effort value when the braking condition is determined to be a gradual braking condition, and restrict the compensation for the predetermined pedal effort value when the braking condition is determined to be neither the sudden braking condition nor the gradual braking condition. The controller may also be configured to determine the braking condition may be the sudden braking condition when a pedal speed is greater than a first pedal speed and an increasing speed of a hydraulic pressure of a brake line is greater than a first increasing speed; and determine the braking condition to be the gradual braking condition when the pedal speed is less than a second pedal speed and the increasing speed of the hydraulic pressure is less than a second increasing speed.

The controller may be configured to set the amount of the increasing or decreasing compensation differently based on a size of the pedal stroke. The controller may be configured to determine the running condition to be an exceptional condition when the vehicle speed is less than a predetermined speed, a leak has occurred in a brake line, at least one of warning lamps is on, a yaw rate of the vehicle is greater than a predetermined yaw rate, or anti-lock brake system (ABS) or brake assist system (BAS) is operating, and restrict the compensation when the running condition is determined to be the exceptional condition.

Additionally, the controller may be configured to calculate a variation rate of the pedal effort value by the compensated pedal effort value and an initial pedal effort value, and learn the compensated pedal effort value when the variation rate is greater than a first predetermined rate and less than a second predetermined rate. The controller may be configured to restrict learning the compensated pedal effort value and generate a warning signal when the variation rate is equal to or less than the first predetermined rate or equal to or greater than the second predetermined rate.

The data detector may include: a pedal stroke detector configured to detect a size of the pedal stroke, a hydraulic pressure detector configured to detect a hydraulic pressure of the brake line, a vehicle speed detector configured to detect a vehicle speed, an instrument panel including warning lamps, a yaw rate detector configured to detect a yaw rate of the vehicle, and special braking detector configured to detect operation of ABS and BAS.

A control method controlling a control system of regenerative braking of hybrid vehicle may include: detecting the data for pedal simulator control; determining a running condition based on the detected data; determining a braking condition based on the detected data; compensating the pedal effort value; and learning the compensated pedal effort value.

The determination of the running condition may include: determining whether the vehicle speed is less than a predetermined speed; determining whether a leak has occurred in the brake lines; determining whether at least one of warning lamps is on; determining whether a yaw rate of the vehicle is greater than a predetermined yaw rate; and determining whether anti-lock brake system (ABS) or brake assist system (BAS) is operating. The determination of the running condition may further include: determining the running condition to be an exceptional condition when the vehicle speed is less than the predetermined speed, the leak has occurred in a brake line, the at least one of warning lamps is on, the yaw rate of the vehicle is greater than the predetermined yaw rate, or the ABS or the BAS is operating; and restricting the compensation when the running condition is determined to be the exceptional condition.

The determination of the braking condition may include: determining the braking condition to be a sudden braking condition when a pedal speed is greater than a first pedal speed and an increasing speed of a hydraulic pressure of a brake line is greater than a first increasing speed; and determining the braking condition to be a gradual braking condition when the pedal speed is less than a second pedal speed and the increasing speed of the hydraulic pressure is less than a second increasing speed. The compensating of the pedal effort value may include: performing an increasing compensation for the pedal effort value when the braking condition is determined to be the sudden braking condition, performing a decreasing compensation for the pedal effort value when the braking condition is determined to be the gradual braking condition, and restricting the compensation for the predetermined pedal effort value when the braking condition is determined to be neither the sudden braking condition nor the gradual braking condition.

Additionally, the compensating of the pedal effort value may include: setting the amount of the increasing or decreasing compensation differently based on a size of the pedal stroke. The learning the compensated pedal effort value further may include: calculating a variation rate of the pedal effort value by the compensated pedal effort value and an initial pedal effort value, learning the compensated pedal effort value when the variation rate is greater than a first predetermined rate and less than a second predetermined rate, and restricting learning the compensated pedal effort value when the variation rate is equal to or less than the first predetermined rate or equal to or greater than the second predetermined rate, and the restricting learning the compensated pedal effort value may include generating a warning signal.

According to an exemplary embodiment of the present invention, the control method of regenerative braking of hybrid vehicle may adjust the brake feeling based on the driver's braking tendency, by learning the driver's braking tendency and compensating the brake feeling based on the driver's braking tendency. Accordingly, the braking performance and the driver's satisfaction regarding the brake feeling may be improved.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SYMBOLS

10: pedal simulator
20: controller
30: data detector
31: pedal stroke detector
33: hydraulic pressure detector
35: vehicle speed detector
37: instrument panel
39: yaw rate detector
41: special braking detector

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Now, a control system of regenerative braking of hybrid vehicle according to an exemplary embodiment of the present invention will be described with reference to accompanying drawings.

Figure 1:
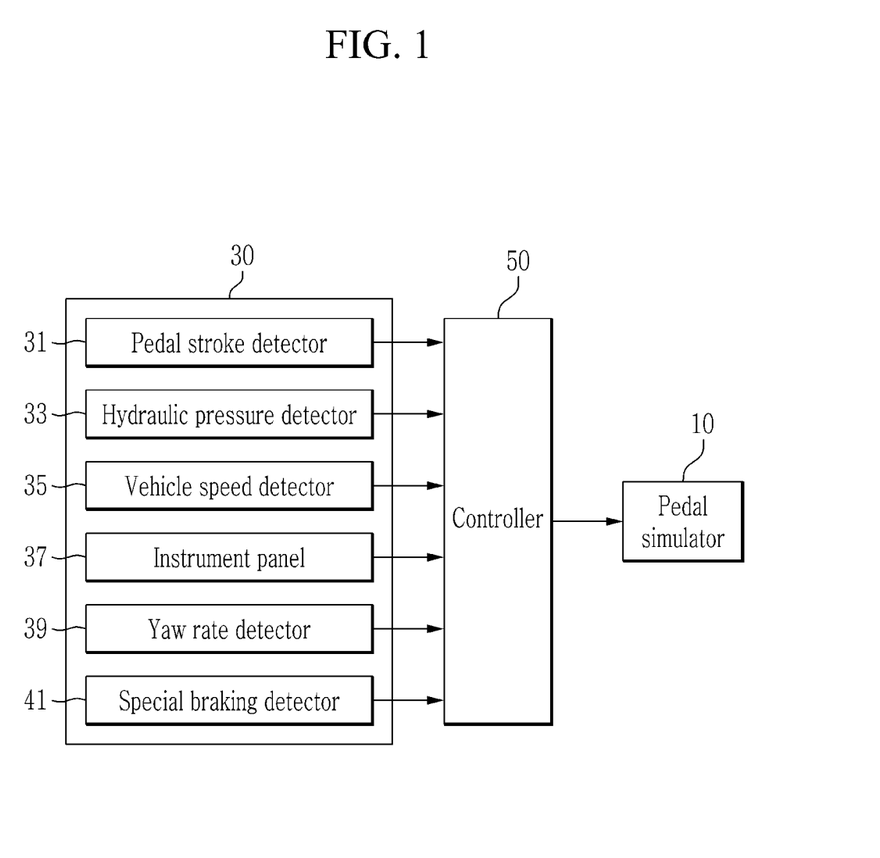
FIG. 1 is a block diagram schematically illustrating a configuration of a control system of regenerative braking of hybrid vehicle according to an exemplary embodiment of the present invention.

FIG. 1 is a block diagram schematically illustrating a configuration of a control system of regenerative braking of hybrid vehicle according to an exemplary embodiment of the present invention. Referring to FIG. 1, a control system of regenerative braking of hybrid vehicle according to an exemplary embodiment of the present invention may include a pedal simulator 10, a data detector 30, and a controller 50. The controller 50 may be configured to operate the pedal simulator and the data detector 30.

The pedal simulator 10 may be configured to generate a pedal effort based on a pedal stroke input through a brake pedal to provide a driver with a brake feeling (e.g., brake engagement feeling). The pedal effort may be generated through hydraulic pressure or elastic force of a spring, and may be differ based on the amount of the pedal stroke. The data detector 30 may be configured to detect data used for operation of the pedal simulator, and transmit the detected data to the controller 50. The data detector 30 may include a pedal stroke detector 31, a hydraulic pressure detector 33, a vehicle speed detector 35, an instrument panel 37, a yaw rate detector 39 and a special braking detector 41. The data detector 30 may further include more detectors (e.g., wheel speed detector) to detect data used for operation of the pedal simulator.

In particular, the pedal stroke detector 31 may be configured to detect a size of a pedal stroke input through the brake pedal, and transmit a signal regarding the detected size to the controller 50. The hydraulic pressure detector 33 may be configured to detect a hydraulic pressure of inside the brake line, and transmit a signal regarding the detected hydraulic pressure to the controller 50. The vehicle speed detector 35 may be configured to detect a vehicle speed, and transmit a signal regarding the detected vehicle speed to the controller 50. The instrument panel 37 of the vehicle may turn on including warning lamps. In addition, the instrument panel 37 may be configured to transmit a signal regarding the state of the warning lamps (e.g., whether the lamps are on or off) to the controller 50.

The yaw rate detector 39 may be configured to detect a yaw rate of the vehicle, and transmit a signal regarding the detected yaw rate to the controller 50. The special braking detector 41 may be configured to detect the operation of special functions regarding brake such as anti-lock brake system (ABS) or brake assist system (BAS). In addition, the special braking detector 41 may be configured to transmit a signal regarding the operation of the ABS or the BAS to the controller 50.

Further, the controller 50 may be configured to operate the pedal simulator 10 based on the data detected by the data detector 30. Additionally, the controller 50 may be configured to store pedal effort value generated by the pedal simulator 10 based on the size of the pedal stroke based on the detected data. The controller 50 may then be configured to compensate the brake feeling by compensating and learning the pedal effort value based on running condition, braking condition, and the driver's braking tendency. The controller 50 may be implemented with at least one processor operating by a predetermined program, and the predetermined program may be programmed to perform each step in a control method of regenerative braking of hybrid vehicle according to an exemplary embodiment of the present invention, which will later be described in more detail.

Figure 2:
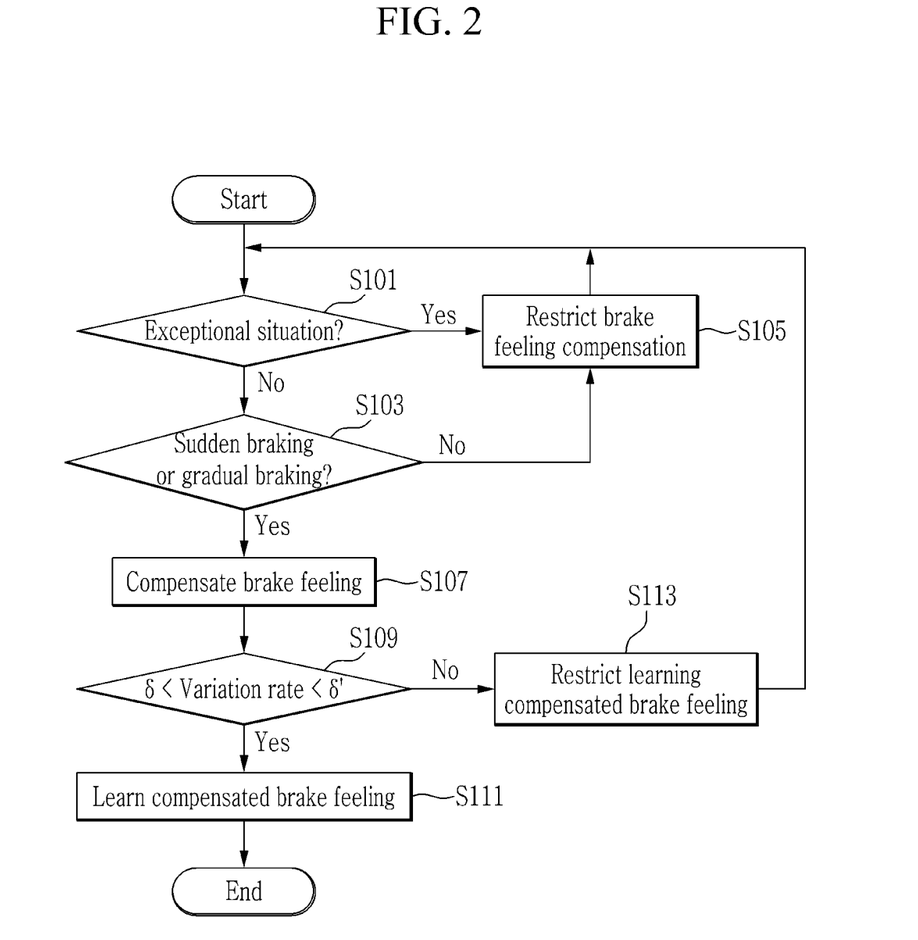
FIG. 2 is a flowchart schematically illustrating a control method of regenerative braking of hybrid vehicle according to an exemplary embodiment of the present invention.
Figure 3:
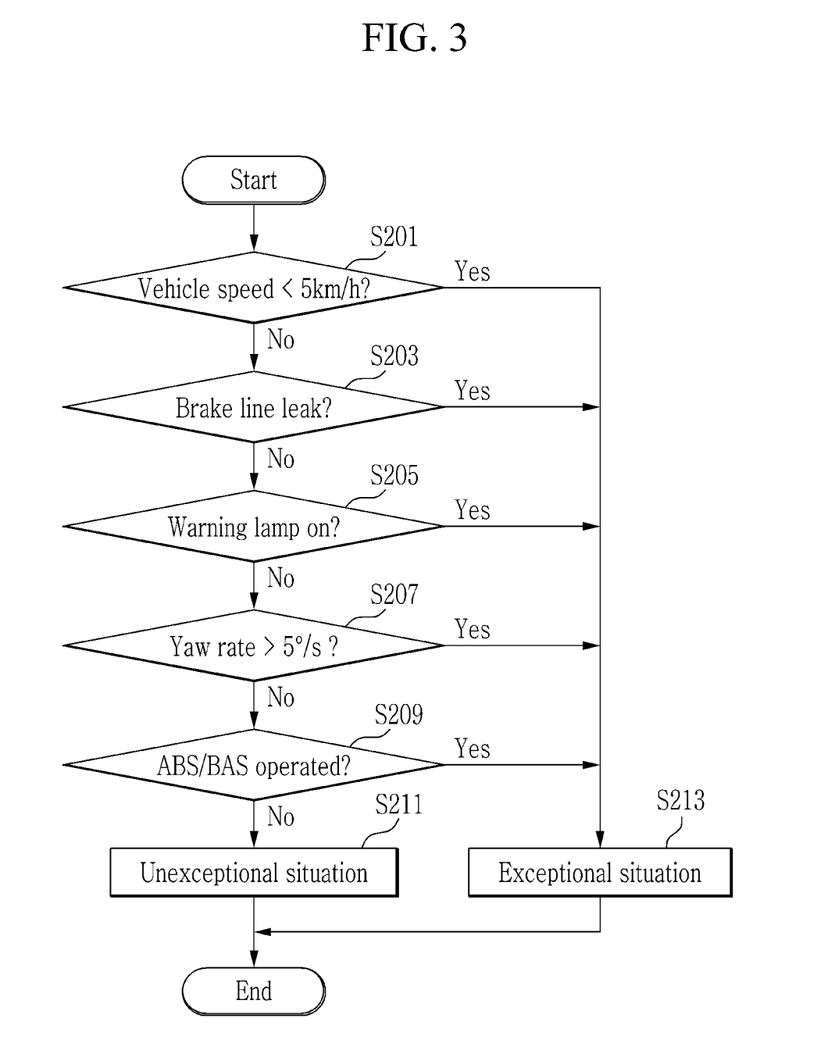
FIG. 3 is a flowchart schematically illustrating a step of determining the running condition according to an exemplary embodiment of the present invention.

Hereinafter, a control method of regenerative braking of hybrid vehicle according to an exemplary embodiment of the present invention is described referring to FIG. 2 an FIG. 3. FIG. 2 is a flowchart schematically illustrating a control method of regenerative braking of hybrid vehicle according to an exemplary embodiment of the present invention, and FIG. 3 is a flowchart schematically illustrating a step of determining the running condition according to an exemplary embodiment of the present invention.

Referring to FIG. 2, the controller 50 may be configured to check the running condition of the vehicle when the pedal stroke is input, and determine whether the running condition of the vehicle is an exceptional condition based on the data detected through the data detector 30 in step S101. The exceptional situation may include a vehicle stop, a leak in the brake lines, that the warning lamp is on, unstable behavior of the vehicle, and the operation of special braking. The exceptional situation is not limited thereto, and may further include more situations determined by those of ordinary skill in the art to be inappropriate for the compensation and learning of the brake feeling.

When the driving condition of the vehicle is determined to be the exceptional condition, the controller may be configured to restrict the compensation of brake feeling in step S105. As described above, an exemplary embodiment of the present invention may perform the compensation for the brake feeling only in the general situation so that the braking behavior occurred in exceptional situations are not learned or reflected to the brake feeling compensation. As a result, the present invention may more accurately reflect the driver's usual braking tendency in the brake feeling.

Moreover, the step in which the controller 50 determines whether a running condition is an exceptional condition in step S101 will be described in detail with reference to FIG. 3. As shown in FIG. 3, the controller 50 may be configured to determine whether the vehicle speed is less than the predetermined speed using a vehicle speed detector 35 in step S201, and when the vehicle speed is less than the predetermined speed, the step S213 may be performed. The predetermined speed may be set to be a value which is determined by those of ordinary skill in the art to be suitable for determining whether the vehicle is stop. For example, the predetermined speed may be about 5 km/h.

A pedal stroke in vehicle stop situation may be irrelevant with the driver's usual braking tendency. For example, the pedal stroke in vehicle stop situation may be longer for the air in the brake oil. Further, the controller 50 may be configured to determine whether a leak has occurred in a brake line using a hydraulic pressure detector 33 in step S203. When the leak has occurred in a brake line, the braking force generated based on the pedal stroke may be deteriorated. As a result, the driver may engage the brake pedal stronger than usual to supplement the deteriorated braking force, and thus, the pedal stroke occurring in this situation may be irrelevant with the driver's usual braking tendency. When the leak is detected to have occurred in the brake line in the step S203, the step S213 may be performed.

The controller 50 may be configured to determine whether at least one of warning lamps is on through an instrument panel 37 in step S205. When the one of warning lamps is on, the vehicle may be in abnormal situation, the pedal stroke occurring in this situation may thus be irrelevant with the driver's usual braking tendency. When the one of warning lamp is on in step S205, the step S213 may be performed. Further, the controller 50 may be configured to determine whether a yaw rate of the vehicle is greater than a predetermined yaw rate through a yaw rate detector 39 in step 207, and determine the running condition to be an unstable behavior situation. The predetermined yaw rate may be set to be a value which is determined by those of ordinary skill in the art to be suitable for determining whether the vehicle behavior is unstable. For example, the predetermined speed may be about 5 degrees per second. When the yaw rate of the vehicle is greater than a predetermined yaw rate in step 207, the step S213 may be performed.

Further, the controller 50 may be configured to determine whether the anti-lock brake system (ABS) or the brake assist system (BAS) is operating in step S209, and determine the running condition to be a special braking condition when ABS or BAS is operating. Accordingly, the step S213 may be performed. The ABS and BAS are systems to support braking when the braking by brake pedal is not performed. Therefore, the pedal stroke occurring when the ABS or BAS is operated may be irrelevant with the driver's usual braking tendency.

The controller 50 may be configured to determine the running condition to be exceptional condition in step S213 when at least one of vehicle stop, leak in the brake lines, warning lamp on, unstable behavior of the vehicle, and the operation of special braking is detected, and step S103 is performed. Otherwise, the controller 50 may be configured to determine the running condition of the vehicle to not be the exceptional situation (e.g., a normal situation), and step S103 may be performed.

Referring to FIG. 2 again, when the running condition is determined not to be exceptional condition, the controller may be configured to determine whether the braking condition is sudden braking or gradual braking condition based on the data detected using the data detector 30 in step S103. The controller 50 may be configured to monitor the received data regarding a pedal stroke using a pedal stroke detector 31 and calculate the pedal speed. The controller 50 may be configured to further monitor the data regarding a hydraulic pressure of a brake line using a hydraulic pressure detector 33 and calculate the increasing speed of the hydraulic.

Additionally, the controller 50 may be configured to determine the braking condition to be sudden braking condition when the pedal speed is greater than a first pedal speed and the increasing speed of a hydraulic pressure of a brake line is greater than a first increasing speed in step S107. On the other hand, the controller 50 may be configured to determine the braking condition to be gradual braking condition when the pedal speed is less than a second pedal speed and the increasing speed of the hydraulic pressure of a brake line is less than a second increasing speed in step S107. The first and second pedal speed and the first and second increasing speed of the hydraulic pressure may be set to be a value which is determined by those of ordinary skill in the art to be suitable for determining whether the braking condition is sudden braking or gradual braking condition. Accordingly, by monitoring both the pedal speed and the increasing speed of hydraulic pressure, an exemplary embodiment of the present invention may reconfirm the driver's intention, reduce the risk of error, and enhance the accuracy of the control method of regenerative braking significantly.

When the braking condition is a sudden braking or gradual braking condition, the controller 50 may be configured to compensate the pedal effort value in step S107. Otherwise, the controller 50 may be configured to restrict the compensation for the pedal effort value in step S105. In particular, when the braking condition is the sudden braking condition, the controller 50 may be configured to execute increasing compensation for the pedal effort. On the other hand, when the braking condition is the gradual braking condition, the controller 50 may be configured to execute decreasing compensation for the pedal effort. The compensated brake effort value according to the step of the compensating the pedal effort value may be calculated by Equation 1.

$$P\_n = P\_o * C \quad \text{Equation 1}$$

In the equation 1, the P_n means the newly compensated braking effort value according to the step of compensating the pedal effort value, the P_o means the existing braking effort value, and C means compensation coefficient.

The compensation coefficient is greater than 1 at the increasing compensation, and is greater than 0 and less than 1 at the decreasing compensation. For example, a compensation coefficient according to an exemplary embodiment of the present invention may be 1.001 in increasing compensation, and may be 0.9999 in decreasing compensation. The compensation coefficient may be set differently based on the size of the pedal stroke. For example, for the size of the pedal stroke in specific range in which the pedal stroke size is generated frequently in sudden braking or gradual braking situations, the compensation coefficient may be set differently, and thus, the brake feeling may be further adjusted, and the braking stability of the vehicle may be improved in such situations. Next, controller 50 may be configured to calculate a variation rate of the pedal effort value with the compensated pedal effort value and an initial pedal effort value, and determine whether the variation rate is greater than a first predetermined rate and less than a second predetermined rate in step S109.

When the warning signal is generated, the driver may determine whether to reset the pedal effort value of which compensation is restricted. The pedal effort value may be reset at repair center. Accordingly, a control system and control method of regenerative braking of hybrid vehicle according to an exemplary embodiment of the present invention control the variation rate of the pedal effort value to be maintained in a constant range. Therefore the present invention may prevent the pedal effort from exceeding the safety standards intended by the design of the vehicle or violating the standards set forth by the relevant laws.

Table 1 represents an example of simulation result of the set value of pedal effort for a pedal stroke in case learning the plus compensation n times and 100 times, and learning the minus compensation n times and 100 times

TABLE 1

| Pedal stroke (mm) | Initial pressure (bar) | Result of increasing compensation for pressure (bar) | | Result of decreasing compensation for pressure (bar) | |
|---|---|---|---|---|---|
| | | Compensated n times | Compensated 100 times | Compensated n times | Compensated 100 times |
| 3 | 1 | $1 * 1.001^n$ | 1.1 | $1 * 0.9999^n$ | 1.0 |
| 5 | 2 | $2 * 1.001^n$ | 2.2 | $2 * 0.9999^n$ | 2.0 |
| 10 | 3 | $3 * 1.001^n$ | 3.3 | $3 * 0.9999^n$ | 3.0 |
| 15 | 6 | $6 * 1.001^n$ | 6.6 | $6 * 0.9999^n$ | 5.9 |
| 20 | 10.5 | $10.5 * 1.001^n$ | 11.6 | $10.5 * 0.9999^n$ | 10.4 |
| 25 | 16 | $16 * 1.001^n$ | 17.7 | $16 * 0.9999^n$ | 15.8 |
| 30 | 24 | $24 * 1.001^n$ | 26.5 | $24 * 0.9999^n$ | 23.8 |
| 35 | 34 | $34 * 1.001^n$ | 37.6 | $34 * 0.9999^n$ | 33.7 |
| 40 | 44 | $44 * 1.001^n$ | 48.6 | $44 * 0.9999^n$ | 43.6 |
| 45 | 57 | $57 * 1.001^n$ | 63.0 | $57 * 0.9999^n$ | 56.4 |
| 50 | 71 | $71 * 1.001^n$ | 78.5 | $71 * 0.9999^n$ | 70.3 |
| 55 | 86 | $86 * 1.001^n$ | 95.0 | $86 * 0.9999^n$ | 85.1 |
| 60 | 101 | $101 * 1.001^n$ | 111.6 | $101 * 0.9999^n$ | 100.0 |
| 70 | 132 | $132 * 1.001^n$ | 145.9 | $132 * 0.9999^n$ | 130.7 |
| 75 | 150 | $150 * 1.001^n$ | 165.8 | $150 * 0.9999^n$ | 148.5 |

According to the Table 1, a method for controlling regenerative braking of hybrid vehicle according to an exemplary embodiment of the present invention may variably adjust the brake feeling by regenerative braking through repeating learning and compensation according to the driver's braking tendency, and thus, the braking performance and the driver's satisfaction regarding to the brake feeling may be improved.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A control system of regenerative braking of hybrid vehicle, comprising:
a pedal simulator configured to provide brake feeling to a driver by generating pedal effort based on a pedal stroke input through a brake pedal;
a data detector configured to detect data for pedal simulator control; and
a controller configured to store a predetermined value of the pedal effort and operate the pedal simulator according to the predetermined pedal effort value based on the detected data,
wherein the controller is configured to compensate and learn the predetermined pedal effort value based on a running condition and a braking condition, and
wherein the controller is configured to:
perform an increasing compensation for the pedal effort value when the braking condition is determined to be a sudden braking condition;
perform a decreasing compensation for the pedal effort value when the braking condition is determined to be a gradual braking condition; and
restrict the compensation for the predetermined pedal effort value when the braking condition is determined to be neither the sudden braking condition nor the gradual braking condition.

2. The control system of claim 1, wherein the controller is configured to:
determine the braking condition to be the sudden braking condition when a pedal speed is greater than a first pedal speed and an increasing speed of a hydraulic pressure of a brake line is greater than a first increasing speed; and
determine the braking condition to be the gradual braking condition when the pedal speed is less than a second pedal speed and the increasing speed of the hydraulic pressure is less than a second increasing speed.

3. The control system of claim 1, wherein the controller is configured to set the amount of the increasing or decreasing compensation differently based on a size of the pedal stroke.

4. The control system of claim 1, wherein the controller is configured to:
determine the running condition to be an exceptional condition when the vehicle speed is less than a predetermined speed, a leak has occurred in a brake line, at least one of warning lamps is on, a yaw rate of the vehicle is greater than a predetermined yaw rate, or anti-lock brake system (ABS) or brake assist system (BAS) is operating; and
restrict the compensation when the running condition is determined to be the exceptional condition.

5. The control system of claim 1, wherein the controller is configured to:
calculate a variation rate of the pedal effort value by the compensated pedal effort value and an initial pedal effort value; and
learn the compensated pedal effort value when the variation rate is greater than a first predetermined rate and less than a second predetermined rate.

6. The control system of claim 5, wherein the controller is configured to:
restrict learning the compensated pedal effort value; and
generate a warning signal when the variation rate is equal to or less than the first predetermined rate or equal to or greater than the second predetermined rate.

7. The control system of claim 1, wherein the data detector includes:
a pedal stroke detector configured to detect a size of the pedal stroke;
a hydraulic pressure detector configured to detect a hydraulic pressure of the brake line;
a vehicle speed detector configured to detect a vehicle speed;
an instrument panel including warning lamps;
a yaw rate detector configured to detect a yaw rate of the vehicle; and
a special braking detector configured to detect operation of anti-lock brake system (ABS) or brake assist system (BAS).

8. A control method of a control system of regenerative braking of hybrid vehicle, comprising:
generating, by a controller, pedal effort based on a pedal stroke input through a brake pedal within the vehicle;
detecting, by the controller, the data for pedal simulator control;
storing, by the controller, a predetermined value of the pedal effort to operate a pedal simulator based on the predetermined pedal effort value using the detected data;
determining, by the controller, a running condition based on the detected data;
determining, by the controller, a braking condition based on the detected data;
compensating, by the controller, the pedal effort value; and
learning, by the controller, the compensated pedal effort value,
wherein the determining of the braking condition includes:
determining, by the controller, the braking condition to be a sudden braking condition when a pedal speed is greater than a first pedal speed and an increasing speed of a hydraulic pressure of a brake line is greater than a first increasing speed; and
determining, by the controller, the braking condition to be a gradual braking condition when the pedal speed is less than a second pedal speed and the increasing speed of the hydraulic pressure is less than a second increasing speed.

9. The control method of claim 8, wherein the determining of the running condition includes:
determining, by the controller, whether the vehicle speed is less than a predetermined speed;
determining, by the controller, whether a leak has occurred in the brake lines;
determining, by the controller, whether at least one of warning lamps is on;
determining, by the controller, whether a yaw rate of the vehicle is greater than a predetermined yaw rate; and
determining, by the controller, whether anti-lock brake system (ABS) or brake assist system (BAS) is operating.

10. The control method of claim 9, wherein the determining of the running condition further includes:
determining, by the controller, the running condition to be an exceptional condition when the vehicle speed is less than the predetermined speed, the leak has occurred in a brake line, the at least one of warning lamps is on, the yaw rate of the vehicle is greater than the predetermined yaw rate, or the ABS or the BAS is operating; and
restricting, by the controller, the compensation when the running condition is determined to be the exceptional condition.

11. The control method of claim 8, wherein the compensating of the pedal effort value includes:
performing, by the controller, an increasing compensation for the pedal effort value when the braking condition is determined to be the sudden braking condition,
performing, by the controller, a decreasing compensation for the pedal effort value when the braking condition is determined to be the gradual braking condition, and
restricting, by the controller, the compensation for the predetermined pedal effort value when the braking condition is determined to be neither the sudden braking condition nor the gradual braking condition.

12. The control method of claim 11, wherein the compensating of the pedal effort value includes:
setting, by the controller, the amount of the increasing or decreasing compensation differently based on a size of the pedal stroke.

13. The control method of claim 8, wherein the learning of the compensated pedal effort value further includes:
calculating, by the controller, a variation rate of the pedal effort value by the compensated pedal effort value and an initial pedal effort value,
learning, by the controller, the compensated pedal effort value when the variation rate is greater than a first predetermined rate and less than a second predetermined rate, and
restricting, by the controller, learning of the compensated pedal effort value when the variation rate is equal to or less than the first predetermined rate or equal to or greater than the second predetermined rate,
wherein the restricting learning the compensated pedal effort value includes generating a warning signal.

* * * * *